US008216665B2

(12) United States Patent
Farchione

(10) Patent No.: US 8,216,665 B2
(45) Date of Patent: Jul. 10, 2012

(54) CORRUGATED PAPERBOARD
(75) Inventor: Frank Farchione, Campbellfield (AU)
(73) Assignee: AMCOR, Ltd. (AU)
(*) Notice: Subject to any disclaimer, the term of this patent is extended or adjusted under 35 U.S.C. 154(b) by 570 days.
(21) Appl. No.: 12/286,928
(22) Filed: Oct. 3, 2008
(65) Prior Publication Data
US 2009/0263629 A1  Oct. 22, 2009
(30) Foreign Application Priority Data
Apr. 22, 2008  (AU) .............................. 2008201776
(51) Int. Cl.
B32B 3/28 (2006.01)
B32B 3/30 (2006.01)
(52) U.S. Cl. .................. 428/182; 428/186; 428/511
(58) Field of Classification Search .................. 428/182, 428/183, 184, 186, 480, 481, 483, 511; 229/5.81, 229/939
See application file for complete search history.

(56) References Cited

U.S. PATENT DOCUMENTS 4,455,184 A * 6/1984 Thompson .............. 156/244.11
6,509,105 B2 * 1/2003 Olvey ......................... 428/481
* cited by examiner Primary Examiner — Catherine A Simone
(74) Attorney, Agent, or Firm — Ryan Kromholz & Manion, S.C.

(57) ABSTRACT

A corrugated paperboard is disclosed. The corrugated paperboard is based on a selection of a polymer blend (which may or may not include a color) for use as (a) as an extrusion layer which allows a layer of a water (and heat) resistant polymer (such as a PET, but which may also be a blend of polymers) and a paper liner to be laminated together and (b) can survive, i.e. be effective at, temperatures of at least 150° C. that are generated in a corrugator to facilitate manufacture of the corrugated paperboard.

28 Claims, 2 Drawing Sheets

CORRUGATED PAPERBOARD

BACKGROUND OF THE INVENTION

The present invention relates to paperboard containers, including corrugated paperboard containers, used to store products such as fruit, vegetables, meat, fish and other produce and to store products, such as cooked food products, for example cakes.

Fibre based containers, such as cardboard boxes, are in common use for the storage of produce and have been for many years. Major advantages of fibre based containers include low cost, 100% recyclability, ability to pack very flat before and after use, a reasonable degree of vibration dampening, and being able to carry printed material.

Paperboard containers are normally manufactured from corrugated paperboard. Corrugated paperboard is made as follows. A sheet of paper is conditioned with heat and steam and is fed into a nip between two corrugating rolls, each roll having a roll profile in the form of a series or corrugations, i.e. a wave-like shape. The corrugating rolls form the paper sheet into a corrugated sheet having the wave-like shape, known as 'corrugated medium'. A second sheet of paper known a 'liner' is then adhered using a hot adhesive such as starch to one side of the corrugated medium. A second liner is then adhered using an adhesive to the other side of the corrugated medium. Thereafter, the three layer construction is heated to between 160 and 260° C. so that the adhesive can dry out and permanently bond the three layers together to form a corrugated board. This whole process is known as the 'corrugated process'.

However, paperboard containers made from corrugated paperboard have limitations. In particular, paperboard is hydroscopic and thereby readily absorbs moisture, and this property reduces its bending stiffness. As the bending stiffness reduces, the container can go out of shape. This can lead to a number of consequences, one of which is so-called 'base-sag'. Base-sag is sagging of a flat bottom of a filled container so that it forms a valley shape. Base-sag is also driven by the weight of the contents of a container.

Base-sag is an issue in the produce industry because the containers used in this industry are normally stacked on top of each other after filling, with lugs often used to keep a distance of about 30 mm between the contents of one container and a bottom of another container that is on top of the container. If the base of the upper container sags, it means that the bottom of the upper container can touch the contents of the lower container. If the produce, for example peaches, in the container is sensitive to contact pressure, the contact can lead to damaged produce which reduces their value.

Wood produce boxes are one known packaging alternative for the produce industry that have minimal base-sag, but these are expensive, difficult to recycle, difficult to flat pack, and have poor vibration dampening.

Another known packaging alternative for the produce industry that has minimal base-sag are boxes made from expanded polystyrene (EPS or 'polystyrene'). While EPS boxes are low cost, have low base-sag, and have good insulation properties, EPS is difficult to recycle and causes extensive environmental issues, and for this reason has been banned as import containers in some countries.

Another known packaging alternative for the produce industry that has minimal base-sag is returnable plastic containers, or RPCs. RPCs can be flat packed and can be repeatedly reused. On the other hand, RPCs have poor vibration dampening characteristics, and to achieve an acceptable cost and environmental impact RPCs need to be shipped from where the produce is purchased, e.g. a supermarket, back to where the produce is packed, which may be in a different state or country. This may not always be a practical, cost-efficient or environmentally friendly option.

Hence, there is a need for paperboard produce containers, for example made from corrugated paperboard, which can be economically used for a single trip and then recycled after use, and are not subject to the base-sag issue.

There have been a number of inventions to minimise base-sag in paperboard containers that are based on stiffening up paperboard containers by using additional material in the containers. While useful solutions, all of these design-based solutions invariably increase the amount of material required and, hence, the cost and environmental impact of the containers.

There have also been a number of inventions to minimise base-sag in paperboard containers by using corrugated paperboard with high stiffness properties. One particular proposal, which is known as 'Xitex' technology and is covered by an extensive patent portfolio, including Australian patent 567833, in the name of the applicant provides a corrugated paperboard that has excellent bending stiffness for a given amount of paper consumption. The Xitex process adhere the tips of two corrugated mediums together, after one of these corrugated mediums has been joined to a liner. A second liner is then adhered to the other corrugated medium before heating and drying the paperboard container.

While containers made from Xitex corrugated paperboard are in widespread use in Australia for produce, because of its excellent bending stiffness and hence low base-sag for a given amount of paper consumption, the containers are susceptible to being weakened by moisture absorption and so can be subject to base-sag.

A variation to Xitex corrugated paperboard is a paperboard with two or three corrugated mediums, where the corrugated mediums are held apart using inner liners. These are known in the art as 'Twin-wall' or 'Triple-wall' boards.

There have also been a number of proposals to minimise base-sag in paperboard containers by reducing absorption of moisture by paperboard.

A traditional proposal to minimise water absorption is to coat a paperboard container with a hydroscopic wax coating. While giving excellent results, the wax coating reduces the recyclability of the container and so is environmentally undesirable.

Another proposal to minimise water absorption is to provide a water resistant polymer coating (a) on one or both sides of a liner before adhering the liner to a corrugated medium in a corrugating process to make a corrugated paperboard or (b) to a manufactured corrugated paperboard.

Polymers such as polyethylene (PE) and polyethylene teraphalate (PET) are known to be applied in these situations.

U.S. Pat. Nos. 3,406,052 and 3,406,052 disclose applying polymer coatings to a corrugated fibreboard after a corrugating process.

U.S. Pat. No. 3,811,987 discloses using a polymer coating on a liner as a bonding agent between the liner and a corrugated medium in a corrugating process.

International patent publication WO05014283, and a number of other patents in this field, discloses the use of polymer coatings on paperboard that is to be used for liquid packaging applications.

It is also known to laminate polymer films onto liners before corrugating the liners. However, these laminations are held together by adhesives that are based on water or other solvents, and therefore the water or other solvents have to be removed during a drying process after forming the laminations. This drying process adds additional cost to the manufacturing process.

In addition to minimising base-sag, it is also desirable to produce a paperboard container with an attractive appearance. For example, in some parts of the produce market a strong primary colour such a black is regarded as being attractive. Other colours are also regarded as being attractive. Hence, any new solutions to the problem of base-sag have to be acceptable solutions from the viewpoint of providing colour for paperboard containers.

A glossy finish is also thought to improve the appearance of a container. In addition to improving water resistance, coating paperboard with PET can help achieve a glossy appearance. PET also has good resistance to the heat of the corrugating process compared to other commonly-used polymers such as PE and is advantageous on this basis. However, PET can have poor adherence to paperboard. This issue has a bearing on the use of PET on paperboard containers.

The above description is not to be taken as a statement of the common general knowledge in Australia or elsewhere.

SUMMARY OF THE INVENTION

The present invention is based on a selection of a polymer blend (which may or may not include a colour) for use as (a) as an extrusion layer which allows a layer of a water (and heat) resistant polymer (such as a PET, but which may also be a blend of polymers) and a paper liner to be laminated together and (b) can survive, i.e. be effective at, temperatures of at least 150° C. that are generated in a corrugator to facilitate manufacture of a corrugated paperboard.

According to the present invention there is provided a corrugated paperboard comprising a corrugated medium and a lamination adhered together, with the lamination comprising (a) a liner, (b) a layer of a water resistant polymer which is also resistant to temperatures of at least 150° C. that are generated in a corrugating process, and (c) an extrusion layer which holds together the liner and the water resistant polymer layer and which resists delamination at the corrugating process temperatures.

The liner may be made from paper.

The paper may be a kraft paper.

The paper may be made from recycled fibres.

Preferably the water resistant polymer layer is made from a polymer or a blend of polymers that is selected to minimise water absorption of the corrugated paperboard and to provide the corrugated paperboard with a glossy finish.

Preferably the water resistant polymer layer is made from a PET. Other water resistant polymers such as nylon may be used.

The water resistant polymer layer may comprise a metallised polymer layer, such as a polymer layer that has a metal film on one surface of the polymer layer, preferably a surface that forms an outer surface of the lamination.

The metallised polymer layer may comprise a thin layer of metal, metal compound or an inorganic compound and a supporting polymer film.

The extrusion layer of the above-described lamination needs to be able to hold the water resistant polymer layer and the liner together after being heated to high temperatures, i.e. temperatures of at least 150° C., in the corrugating process.

However, forming the extrusion layer so that it only comprises highly adhesive polymers that are effective at temperatures of at least 150° C. has limitations. Firstly, highly adhesive polymers tend to be expensive. Secondly, colours, which are desirable additives, do not usually mix easily with highly adhesive polymers such as ethylene acrylate.

For the above reasons, preferably low cost polymers are used to facilitate introduction of a colour and to increase the bulk of the extrusion layer.

The additional bulk provided by the lower cost polymers or the polymer blends helps with processing by providing the extrusion layer with sufficient bulk to flow easily.

The low cost polymers may be a blend of high and lower melting point polymers.

The blend of low cost, high and lower melting point polymers may be used to control the melting point and other extrusion and processing properties of the extrusion layer. A lower melting point polymer may have improved extrusion properties, while a high melting point polymer may better resist melting during the subsequent corrugation process.

The extrusion layer may comprise a blend of a highly adhesive polymer, a low cost polymer or polymer blend and, optionally a colour.

Preferably the extrusion layer comprises a concentration gradient so that the two outer surface regions of the extrusion layer have a higher concentration of the highly adhesive polymer than an inner region, and the inner region has higher concentrations of the low cost polymer and the colour (if present) than the surface regions.

Alternatively, the extrusion layer may comprise a multilayer arrangement that comprises (a) opposed outer layers of a highly adhesive polymer and (b) a middle layer of a low cost polymer or polymer blend.

Preferably the multilayer arrangement is formed by co-extruding the outer layers of the highly adhesive polymer and the middle layer of the low cost polymer or polymer blend.

One or more than one layer of the multilayer arrangement may comprise a colour.

Preferably the outer layers of the multilayer arrangement are each between 1 and 10 um thick, typically 3 um thick.

Preferably the low cost polymer or polymer blend is 30 to 70% of the extrusion layer.

Higher amounts of the high melting point polymer may used in the low cost polymer blend when it is required to increase the melting temperature of the low cost polymer blend.

Preferably the high melting point polymer is a high density polymer, such as a high density polyethylene.

Preferably the lower melting point polymer is a low density polymer, such as a low density polyethylene.

The highly adhesive polymer may be a Bynel™ adhesive polymer, which is an ethylene acrylate resin.

The highly adhesive polymers may also be a variant of the Bynel polymer mentioned in the above paragraph but supplied by a company other than Du Pont, who are the suppliers of Bynel.

The highly adhesive polymer may be any other suitable ethylene vinyl acetate, an acid modified ethylene acrylate, an anhydride modified ethylene acrylate, an anhydride modified ethylene vinyl acetate, an acid/acrylate modified ethylene vinyl acetate, an anhydride modified ethylene vinyl acetate, an anhydride modified low or high density polyethylene, or an anhydride modified polypropylenes.

The corrugated paperboard may comprise a Xitex-type corrugated paperboard having two corrugated mediums adhered together and two liners adhered to the outer surfaces of the assembly of the corrugated mediums, with at least one of the liners comprising the above-described lamination.

According to the present invention there is also provided a lamination for use in manufacturing the above-described corrugated paperboard, with the lamination comprising (a) a liner, (b) a layer of a water resistant polymer which is also resistant to temperatures of at least 150° C. that are generated in a corrugating process, and (c) an extrusion layer which holds together the liner and the water resistant polymer layer and which resists delamination at the corrugating process temperatures.

According to the present invention there is also provided a paperboard container made from the above-described corrugated paperboard.

According to the present invention there is also provided a corrugating process that comprises forming the above-described lamination, forming the corrugated medium, and adhering the lamination and the corrugated medium together and forming the corrugated paperboard.

The process may also comprise adhering another lamination or another type of liner to the corrugated medium.

BRIEF DESCRIPTION OF THE DRAWINGS

An embodiment of the present invention will now be described in detail with reference to the accompanying drawings, of which.

DETAILED DESCRIPTION

Figure 1:
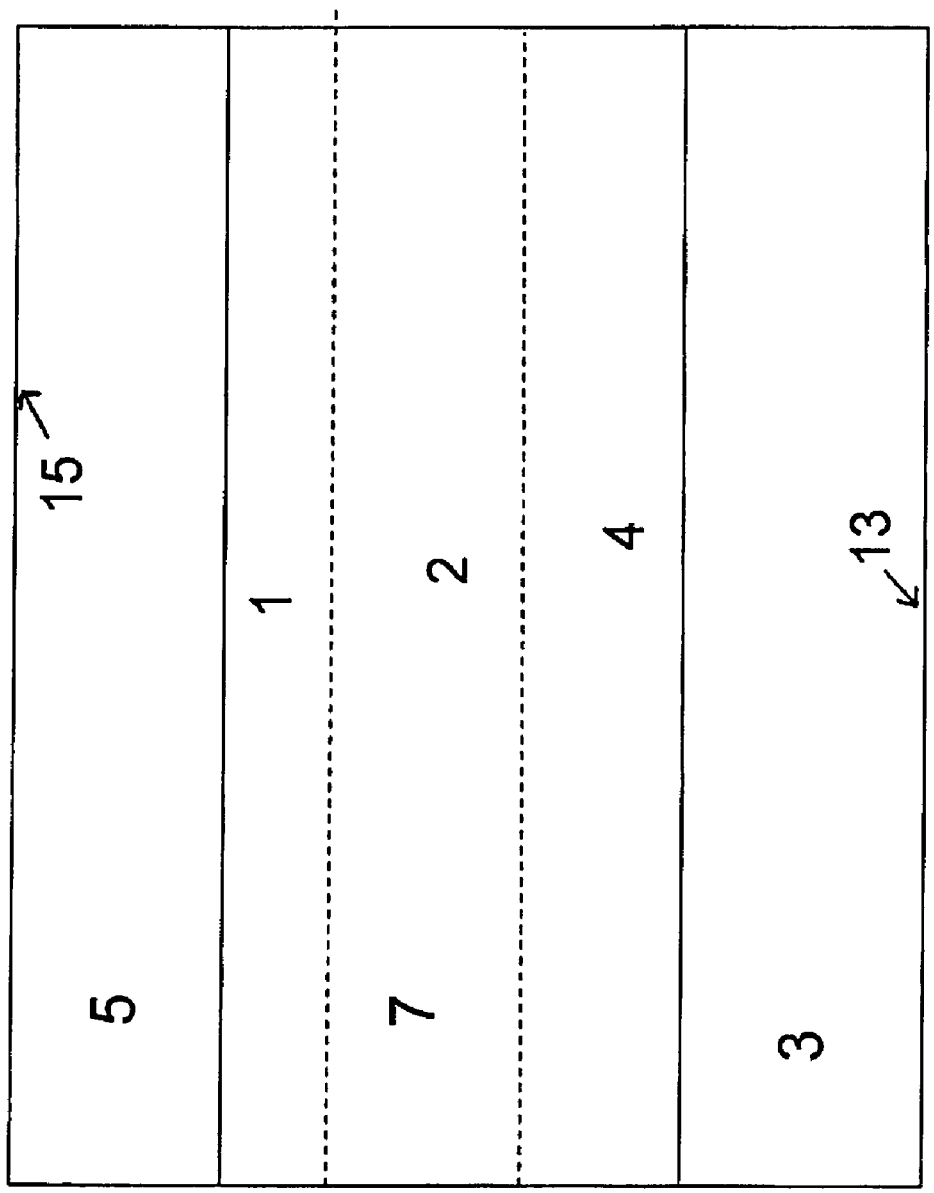
FIG. 1 shows a transverse cross-section through a lamination prior to the lamination being supplied to a corrugator and being formed into one embodiment of a corrugated paperboard in accordance with the present invention that comprises a corrugated medium and the lamination adhered together in accordance with the present invention.

The lamination shown in the FIG. 1 comprises:

(a) a kraft paper liner 3 that forms an outer region of the lamination and has an outer surface 13, (b) a layer 5 of PET film, i.e. a water resistant polymer which is resistant to temperatures of at least 150° C. that are typically generated in a corrugating process, that forms an opposed outer region of the lamination and has an outer surface 15, and (c) an extrusion layer 7 which holds together the liner 3 and the PET layer 5 and is effective at corrugating process temperatures.

Figure 2:
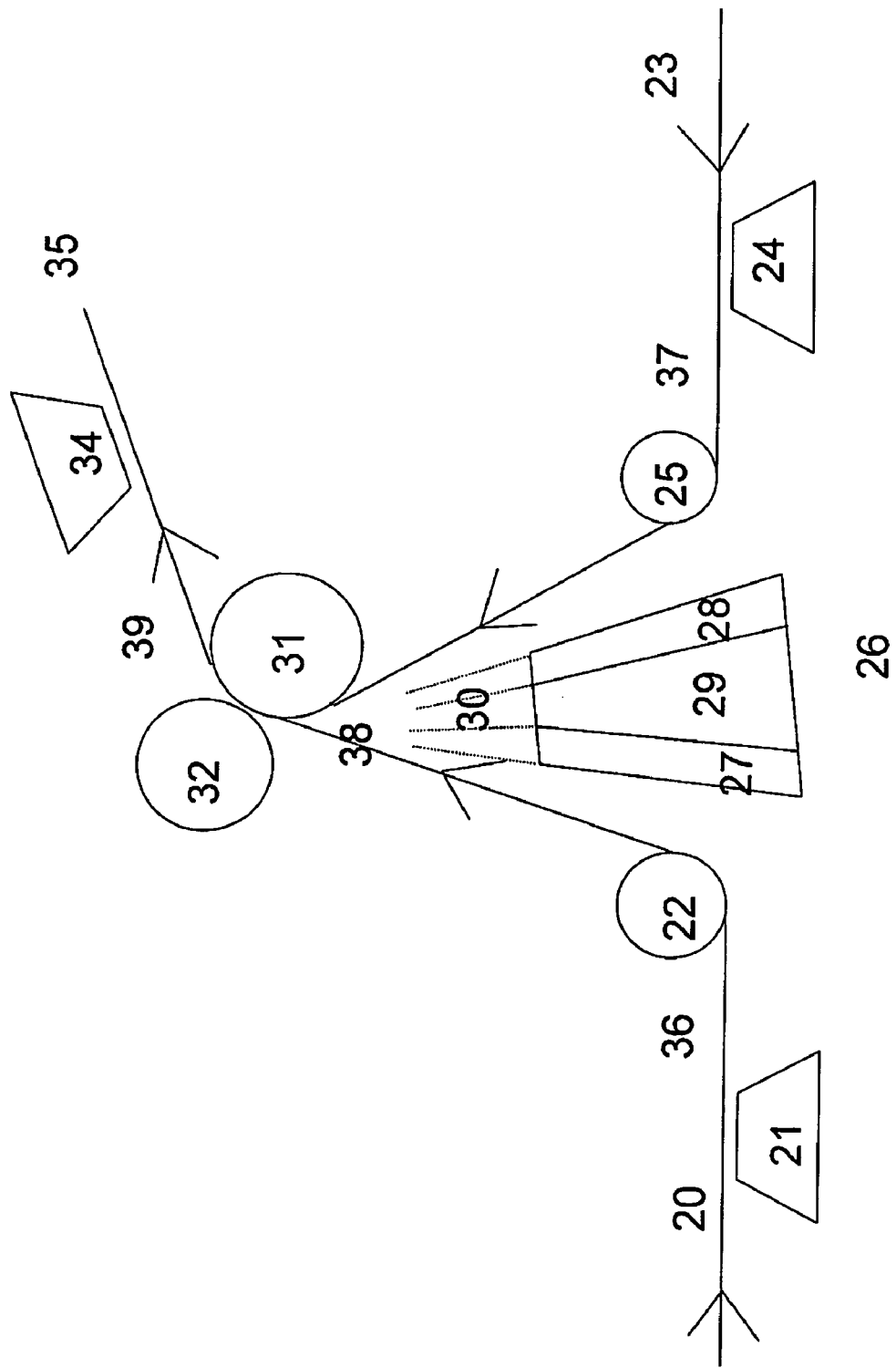
FIG. 2 shows a schematic layout of one embodiment of an apparatus that can be used to produce the lamination shown in FIG. 1.

The lamination is formed by extruding the extrusion layer 7 between the PET layer 5 and the kraft liner 3, as is described further by way of example with reference to FIG. 2.

The extrusion layer 7 comprises a multilayer co-extruded arrangement that comprises:

(a) outer layers 1, 4 of a highly adhesive polymer such as Du Pont resins known by the trade mark 'Bynel' that have strong adhesion to heat resistant polymers such as a PET and can resist the high temperatures of a corrugator, and (b) a middle layer of a blend of a low cost polymer blend 2 comprising a high melting point polymer such as a high density polyethylene and a lower melting point extrudable polymer such as a low density polyethylene.

The highly adhesive polymer may comprise any suitable acid modified ethylene acrylate, anhydride modified ethylene acrylate, anhydride modified ethylene vinyl acetate, acid/acrylate modified ethylene vinyl acetate, anhydride modified ethylene vinyl acetate, anhydride modified low or high density polyethylene or anhydride modified polypropylenes.

One or more of the layers may comprise a colour.

In the extrusion process to form the extrusion layer 7, the polymers are heated to temperatures that ensure a workable viscosity. In the case of the above-mentioned polymers, the temperatures range from 280 to 330° C., typically 315° C.

The extrusion layer 7 is typically 20 um thick, although a broad range of thicknesses could be used, i.e. from 10 to 50 um.

Both the low cost high melting point polymer and the low cost lower melting point polymer used in the extrusion layer 7 can be any suitable polymers in any suitable amounts.

The selection of the low cost polymers used in the extrusion layer 7 is not confined to low density polyethylene and high density polyethylene, even though these polymers are preferred polymers.

Preferably the low density polyethylene is 30 to 70% of the low cost polymer blend. Higher amounts of high density polyethylene may be used when it is required to increase the melting temperature of the blend of the polymers.

In one particular example, a mixture of 50% low density polyethylene and 50% high density polyethylene is used.

The amount of the colour may range from 1% up to 50%, depending on the colour used and the desired colour density.

Typically, a 5% carbon black pigment and a 20% titanium dioxide colour is used to achieve a black shading and a white shading, respectively.

FIG. 2 shows a schematic layout of an apparatus to produce an embodiment of the lamination of the present invention. The lamination produced by the apparatus is of the type shown in FIG. 1 and is formed from a kraft paper layer 23 (which corresponds to the layer 3 in FIG. 1), a PET layer 20 (which corresponds to the layer 5 in FIG. 1), and an extrusion layer that holds the layers 20, 23 together (which corresponds to the layer 7 in FIG. 1).

With reference to FIG. 2, the PET layer 20 is corona-treated at station 21 in order to increase its surface energy and to assist bonding. The PET layer is not heated immediately prior to lamination.

The bonding surface of the paper liner 23 is flame-treated at station 24 to remove any loose fibres, which brings its temperature to about 40 to 60° C.

The corona-treated PET layer 36 and the flame-treated paper liner 37 are passed around tension rolls 22 and 25, respectively, and brought together in a nip 38 formed between a nip roll 32 and a chilled roll 31.

A co-extrusion unit 26 forms a co-extrusion jet 30 that is directed towards the nip 38 and contacts the inwardly facing, i.e. bonding, surfaces of the corona-treated PET layer 36 and the flame-treated paper liner 37 and adheres the layers together in the nip 38 and forms a lamination 39.

The jet 30 produced by the co-extrusion unit 26 comprises three layers, namely highly adhesive polymer outer layers 27 and 28 and an inner layer 29 comprising a blend of low cost high melting polymer and low cost lower melting point polymers. The polymers are of the type described above in relation to FIG. 1.

The lamination 39 passes from the nip 38 to a station 34 and the outer surface of the PET layer of the lamination 39 is corona-treated at the station 34 to increase its coefficient of friction and to assist bonding of this surface to a corrugated paperboard (not shown) during a subsequent process of forming a corrugated container from the lamination and a corrugated medium, by way of example.

Preferably the PET layer 20 is between 6 and 30 um thick, typically 12 um thick, in the lamination 39.

In one particular example, the kraft paper liner 23 has a grammage of 165 gsm, although it is easily possible to use any workable grammage for the liner 23, for example ranging from 50 gsm up to 350 gsm depending on the material from which the liner 23 is made. For example, a liner containing a partial or complete recycled paper component could be used and a suitable grammage could be readily determined to suit a particular application.

In another embodiment of the present invention the PET layer 20 is 'reverse printed' before being laminated, i.e the water resistant layer is printed using a convention printing process such as gravure or flexographic printing on one surface, and this printed surface is then extrusion laminated to the paper liner as described previously. An advantage of reverse printing in this manner is that the unprinted side of the water resistant layer that then ends up on the outside of the final corrugated board has a high gloss and high quality finish, and so able to promote the products being packaged using the corrugated board.

In another embodiment of the present invention the PET layer 20 is printed on the outside layer, i.e. the outside surface of the lamination 39 is printed.

In either of the above two embodiments the extrusion layer can comprise a colour which can provide a background to the reverse printing or printing, or alternatively not comprise a colour. In the later case, the reverse printing or printing can completely hide the colour of the paper liner 23, or alternatively the colour of the liner 23 can show through the reverse printing or printing.

In another embodiment of the present invention, a metallised polymer layer 20 is used as the water resistant layer.

A metallised polymer layer is suitable for applications where insulation properties of a paperboard container formed from the corrugated paperboard are an important consideration. Paperboard containers made using the present invention then become a suitable substitute from containers from expanded polystyrene ("EPS"), including for applications where the containers are used to store products that need to be kept refrigerated such as fresh seafood and meats. Unlike containers made from EPS, containers made according to the present invention can be easily recycled and do not cause the environmental contamination of EPS.

The metallised polymer layer comprises a thin layer of metal, metal compound or an inorganic compound. Suitable metals for a metallised layer include magnesium, indium, aluminium and titanium and oxides and nitrides of these metals. Compounds of other metals may be suitable for forming the metal layer provided the formed layer has the required reflectivity properties.

The metallised polymer layer also comprises a supporting polymer film. Suitable films include films made from a range of possible polymers including bi-axially oriented polypropylene films (BOPP), PET, polyethylene and other polymer films. However, the film is preferably PET.

The metal layer may be formed on the supporting film, i.e. a substrate layer, by usual processes such as vacuum deposition, ion plating, sputtering, plasma deposition, electron beam processes or chemical vapour deposition.

The thickness of the metallised polymer layer will vary depending upon the exact nature of the compound used, the characteristics required and the need to keep the layer as thin as possible to ensure the required flexibility. This metallised processes take place separately and off-line to this present invention.

These metallised polymer layers 20 are applied with the metallised side of the layer extrusion laminated to the corrugated board as previously described. In this way the polymer part of the metalised polymer layer protects the metal layer.

In another embodiment of this present invention, the corrugated paperboard produced, with either a metallised water resistant layer or a non-metallised heat resistant layer, is used form an insulated container which comprises inner wall panels spaced apart from outer wall panels, as described in Australian innovation patent 2005100989 to the applicant, which is incorporated in its entirety in this document by reference.

A range of corrugating processes can be used to make corrugated board from the lamination of the present invention and a corrugated medium.

The process options include, by way of example, conventional corrugating processes, the Xitex process, and a process based on the use of a single-face corrugator that is in-line with a laminator—for example the technology known in the art by the trade mark 'Asitrade'.

Many modifications may be made to the embodiments of the corrugated paperboard described above without departing from the spirit and scope of the invention.

The invention claimed is:

1. A corrugated paperboard comprising a corrugated medium and a lamination adhered together, with the lamination comprising (a) a liner, (b) a layer of a water resistant polymer which is also resistant to temperatures of at least 150° C. that are generated in a corrugating process, and (c) an extrusion layer which holds together the liner and the water resistant polymer layer and which resists delamination at the corrugating process temperatures, and wherein the extrusion layer comprises a multilayer arrangement that comprises (a) opposed outer layers of a highly adhesive polymer and (b) a middle layer of a blend of low cost high and lower melting point polymers.

2. The corrugated paperboard defined in claim 1 wherein the water resistant polymer layer is made from a polymer or a blend of polymers that is selected to minimise water absorption of the corrugated paperboard and to provide the corrugated paperboard with a glossy finish.

3. The corrugated paperboard defined in claim 2 wherein the water resistant polymer layer is made from a PET.

4. The corrugated paperboard defined in claim 1 wherein the extrusion layer comprises a colour.

5. The corrugated paperboard defined in claim 1 wherein the multilayer arrangement is formed by co-extruding the outer layers and the middle layers.

6. The corrugated paperboard defined in claim 1 wherein one or more than one layer of the multilayer arrangement comprises a colour.

7. The corrugated paperboard defined in claim 1 wherein at least the middle layer comprises a colour.

8. The corrugated paperboard defined in claim 1 wherein the outer layers of the extrusion layer are each between 1 and 10 um thick.

9. The corrugated paperboard defined in claim 1 wherein the high melting point polymer is a high density polymer.

10. The corrugated paperboard defined in claim 1 wherein the lower melting point polymer comprises a low density polymer.

11. The corrugated paperboard defined in claim 1 wherein the highly adhesive, polymer is an ethylene vinyl acetate, an acid modified ethylene acrylate, an anhydride modified ethylene acrylate, an anhydride modified ethylene vinyl acetate, an acid/acrylate modified ethylene vinyl acetate, an anhydride modified ethylene vinyl acetate, an anhydride modified low or high density polyethylene or an anhydride modified polypropylenes.

12. The corrugated paperboard defined in claim 1 wherein the water resistant polymer layer is reverse printed.

13. The corrugated paperboard defined in claim 1 wherein the water resistant polymer layer is printed on an outside surface of the lamination.

14. The corrugated paperboard defined in claim 1 where the water resistant polymer layer is metallised on either side of the layer.

15. A paperboard container made from the corrugated paperboard defined in claim 1.

16. A paperboard container made from the corrugated paperboard defined in claim 15 which comprises inner wall panels spaced apart from outer wall panels.

17. A corrugated paperboard comprising a corrugated medium and a lamination adhered together, with the lamination comprising (a) a liner, (b) a layer of a water resistant polymer which is also resistant to temperatures of at least 150° C. that are generated in a corrugating process, and (c) an extrusion layer which holds together the liner and the water resistant polymer layer and which resists delamination at the corrugating process temperatures, wherein the extrusion layer comprises a blend of a highly adhesive polymer, a low cost high melting point polymer, a low cost lower melting point polymer and, optionally a colour, and wherein the extrusion layer comprises a concentration gradient so that two opposed outer surface regions of the extrusion layer have a higher concentration of the highly adhesive polymer than an inner region of the extrusion layer, and the inner region has higher concentrations of the low cost high melting point polymer and the low cost lower melting point polymer and the colour(if present) than the surface regions.

18. The corrugated paperboard defined in claim 17 wherein the water resistant polymer layer is made from a polymer or a blend of polymers that is selected to minimise water absorption of the corrugated paperboard and to provide the corrugated paperboard with a glossy finish.

19. The corrugated paperboard defined in claim 17 wherein the water resistant polymer layer is made from a PET.

20. The corrugated paperboard defined in claim 17 wherein the extrusion layer comprises a colour.

21. The corrugated paperboard defined in claim 17 where in the high melting point polymer is a high density polymer.

22. The corrugated paperboard defined in claim 17 wherein the lower melting point polymer comprises a low density polymer.

23. The corrugated paperboard defined in claim 17 wherein the highly adhesive polymer is an ethylene vinyl acetate, an acid modified ethylene acrylate, an anhydride modified ethylene acrylate, an anhydride modified ethylene vinyl acetate, an acid/acrylate, modified ethylene vinyl acetate, an anhydride modified ethylene vinyl acetate, an anhydride modified low or high density polyethylene or an anhydride modified polypropylenes.

24. The corrugated paperboard defined in claim 17 wherein the water resistant polymer layer is reverse printed.

25. The corrugated paperboard defined in claim 17 wherein the water resistant polymer layer is printed on an outside surface of the lamination.

26. The corrugated paperboard defined in claim 17 where the water resistant polymer layer is metallised on either side of the layer.

27. A paperboard container made from the corrugated paperboard defined in claim 17.

28. A paperboard container made from the corrugated paperboard defined in claim 27 which comprises inner wall panels spaced apart from outer wall panels.

* * * * *